United States Patent
Koroku (10) Patent No.: US 9,773,144 B2
(45) Date of Patent: Sep. 26, 2017

(54) COMMUNICATION SYSTEM, CONTROL METHOD FOR ELECTRONIC DEVICE AND COMMUNICATION SYSTEM, AND COMPUTER-READABLE STORAGE MEDIUM

(71) Applicant: Casio Computer Co., Ltd., Shibuya-ku (JP)

(72) Inventor: Taisuke Koroku, Sagamihara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/076,312

(22) Filed: Mar. 21, 2016

(65) Prior Publication Data
US 2016/0295619 A1    Oct. 6, 2016

(30) Foreign Application Priority Data
Mar. 30, 2015    (JP) .................. 2015-068216

(51) Int. Cl.
*H04B 7/00*        (2006.01)
*G06K 7/14*        (2006.01)
*H04W 12/00*       (2009.01)

(52) U.S. Cl.
CPC .......... *G06K 7/1447* (2013.01); *H04W 12/00* (2013.01)

(58) Field of Classification Search
CPC . H04W 76/021; H04W 76/025; H04W 12/00; G06K 7/1447
USPC ...................... 455/41.1, 41.2, 41.3
See application file for complete search history.

(56) References Cited

U.S. PATENT DOCUMENTS

| | | | |
|---|---|---|---|
| 8,644,842 B2* | 2/2014 | Arrasvuori | G06Q 30/00 455/404.2 |
| 2007/0198286 A1* | 8/2007 | Tomita | G06F 21/32 713/182 |
| 2013/0050259 A1* | 2/2013 | Ahn | G06F 3/1454 345/633 |
| 2014/0269646 A1* | 9/2014 | Ramasamy | H04W 76/023 370/338 |
| 2016/0062572 A1* | 3/2016 | Yang | G06F 3/0482 715/835 |
| 2016/0295619 A1* | 10/2016 | Koroku | H04W 12/00 |

FOREIGN PATENT DOCUMENTS

JP          2007-20042        1/2007

* cited by examiner

*Primary Examiner* — Md Talukder
(74) *Attorney, Agent, or Firm* — Cozen O'Connor (57) ABSTRACT

A communication system includes a first electronic device and at least one second electronic device. The second electronic device has a communication function section having a function for performing communication and an identification image presentation section which provides, at a position that can be captured from outside, an identification image having device information including the type of a communication standard for the communication to be performed by the communication function section. The first electronic device has a control section and a display section, and the control section acquires the device information from a captured image of the identification image, and causes a combination image that is a combination of an image of the second electronic device and image information correspond to the device information to be displayed on the display section.

18 Claims, 8 Drawing Sheets

COMMUNICATION SYSTEM, CONTROL METHOD FOR ELECTRONIC DEVICE AND COMMUNICATION SYSTEM, AND COMPUTER-READABLE STORAGE MEDIUM

CROSS-REFERENCE TO RELATED APPLICATION

This application is based upon and claims the benefit of priority from the prior Japanese Patent Application No. 2015-068216, filed Mar. 30, 2015, the entire contents of which are incorporated herein by reference.

BACKGROUND OF THE INVENTION

1. Field of the Invention

The present invention relates to a communication system for the transmission and reception of information and data between electronic devices positioned relatively close to each other, such as wireless LAN communication or Bluetooth communication, a control method for an electronic device and a communication system, and a computer-readable storage medium.

2. Description of the Related Art

In recent years, portable electronic devices such as smartphones (high-functionality portable telephones) and tablet terminals having functions conforming to short-distance wireless communication standards such as wireless LAN (Local Area Network) and Bluetooth (registered trademark) are significantly prevalent. In these electronic devices, information and data can be transmitted and received by using wireless communication between not only devices of the same type but also electronic devices of different types, such as between a smartphone or tablet terminal and a personal computer, printer, wireless LAN router, digital camera, or smartwatch.

In general, as a method for determining an electronic device that is a connection target when information and data are transmitted and received between electronic devices by using wireless communication, a method is adopted in which information regarding electronic devices that are connection candidates is acquired by using means defined by a wireless communication standard to be used, the acquired information regarding the electronic devices is displayed on a display, and an electronic device that serves as a connection target is selected and determined by a user viewing the displayed information and making a judgment.

An example of this type of connection target determining method for wireless communication is disclosed in Japanese Patent Application Laid-Open (Kokai) Publication No. 2007-020042. In this technique, when the operation mode of an electronic camera is switched to a wireless LAN mode, profiles of computers and printers that are connection candidates are displayed in a list form on a liquid-crystal display and, by a user selecting a connection target, the electronic camera and the connection target are connected to each other via a wireless network, so that image data is transferred to the connection target.

Generally, in this type of connection target determining method, as information regarding electronic devices that are connection candidates, a plurality of pieces of technical information such as product names, type numbers, their addresses, identification information (ID) of all devices are displayed on a display in a list form.

However, with the displayed technical information list alone, the electronic devices that are connection candidates cannot be intuitively recognized. Moreover, when similar pieces of information regarding a plurality of electronic devices are displayed in a list form, it is difficult to judge which electronic device is to be selected as a connection target, and an erroneous selection may be made. As a result, connection to an unintended electronic device may be made, or connection may not be established. Problems in this connection target determining method will be described in detail later in comparative verification.

SUMMARY OF THE INVENTION

The present invention has an advantage of providing a communication system, a control method for an electronic device and a communication system, and a computer-readable storage medium by which connection to an intended electronic device can be easily and reliably made when information and data are transmitted and received between electronic devices by using wireless communication.

In accordance with one aspect of the present invention, there is provided a communication system comprising: a first electronic device, and at least one second electronic device, wherein the second electronic device includes (i) a first communication function section having a function for communication with the first electronic device and (ii) an identification image presentation section which provides, at a position that can be captured from outside, an identification image having device information including a type of a communication standard for the communication to be performed by the first communication function section, wherein the first electronic device includes a control section and a display section, and wherein the control section (i) acquires the device information from a captured image of the identification image, and (ii) causes a combination image that is a combination of an image of the second electronic device and image information correspond to the device information to be displayed on the display section.

In accordance with another aspect of the present invention, there is provided an electronic device comprising: a control section, and a display section, wherein the control section (i) acquires device information from a captured image of an identification image which is provided on a position that can be captured from outside of at least one other electronic device having a function for communication, wherein the identification image has the device information including a type of a communication standard for communication to be performed by the other electronic device, and (ii) causes a combination image that is combination of an image of the other electronic device and image information correspond to the device information to be displayed on the display section.

In accordance with another aspect of the present invention, there is provided an electronic device comprising: an identification image presentation section which provides an identification image on a position that can be captured from outside, wherein the identification image includes device information indicating a type of a communication standard for communication to be performed by the electronic device.

In accordance with another aspect of the present invention, there is provided a control method for a communication system, the communication system comprising a first electronic device and at least one second electronic device, wherein the second electric device includes a function for communication and an identification image presentation section which provides, at a position that can be captured from outside, an identification image having device information including a type of a communication standard for communication to be performed by the second electronic device, the control method comprising: a step of acquiring, in the first electronic device, the device information from a captured image of the identification image, and a step of causing a combination image that is combination of an image of the second electronic device and image information correspond to the device information to be displayed on a display section of the first electronic device.

In accordance with another aspect of the present invention, there is provided a non-transitory computer-readable storage medium having stored thereon a control program for a communication system, the communication system comprising a first electronic device and at least one second electronic device, wherein the second electric device includes a function for communication and an identification image presentation section which provides, at a position that can be captured from outside, an identification image having device information including a type of a communication standard for communication to be performed by the second electronic device, the control program being executable by a computer to actualize functions comprising: processing for acquiring, in the first electronic device, the device information from a captured image of the identification image, and processing for causing a combination image that is a combination of an image of the second electronic device and image information correspond to the device information to be displayed on a display section of the first electronic device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

A communication system, a control method for an electronic device and a communication system, and a control program for same according to the present invention will hereinafter be described in detail by presenting embodiments.

First Embodiment

Figure 1A:
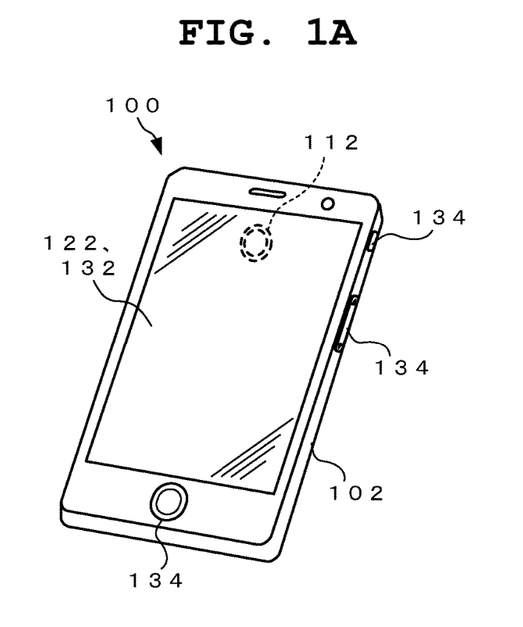
FIG. 1A to FIG. 1E are schematic structural diagrams showing a first embodiment of a communication system according to the present invention.
Figure 1B:
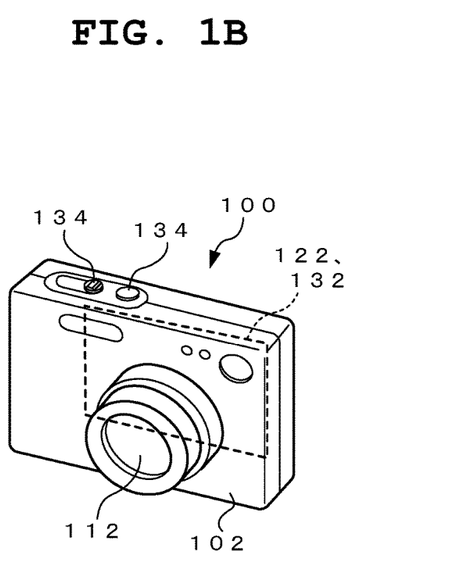
Figure 1C:
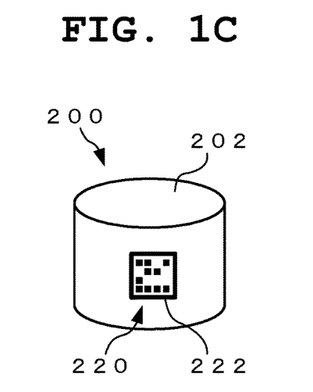
Figure 1D:
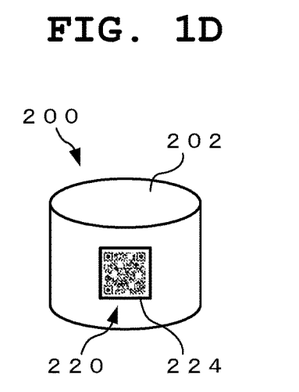
Figure 1E:
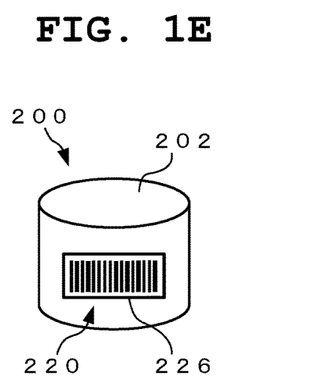

FIG. 1A to FIG. 1E are schematic structural diagrams showing a first embodiment of a communication system according to the present invention, of which FIG. 1A and FIG. 1B are schematic views showing examples of a portable-electronic device according to the present embodiment (hereinafter referred to as "portable device" for convenience of explanation), and FIG. 1C to FIG. 1E are schematic views showing examples of an electronic device serving as a connection target according to the present embodiment (hereinafter referred to as "target device" for convenience of explanation).

Figure 2A:
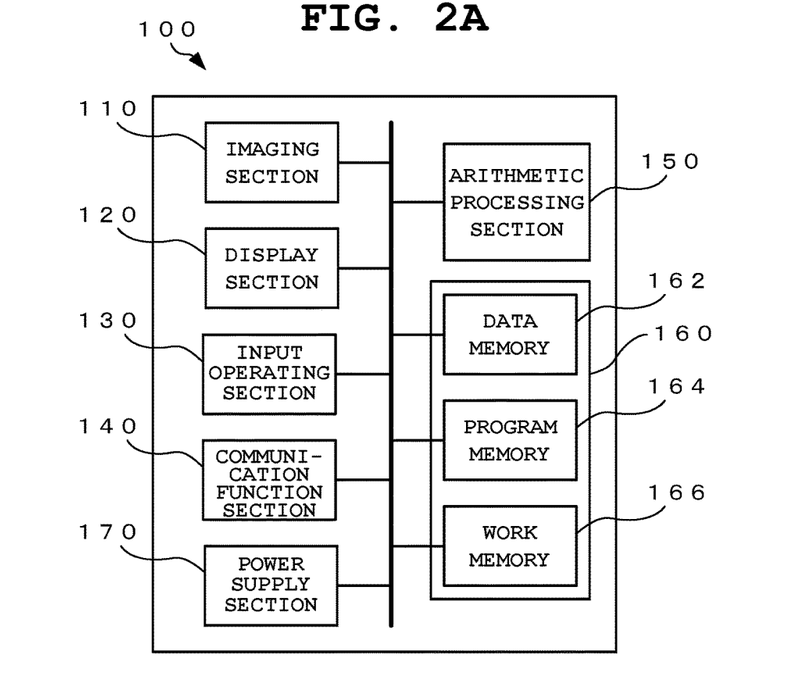
FIG. 2A and FIG. 2B are block diagrams showing examples of the functional structures of a portable device and a target device that are applied in the first embodiment.
Figure 2B:
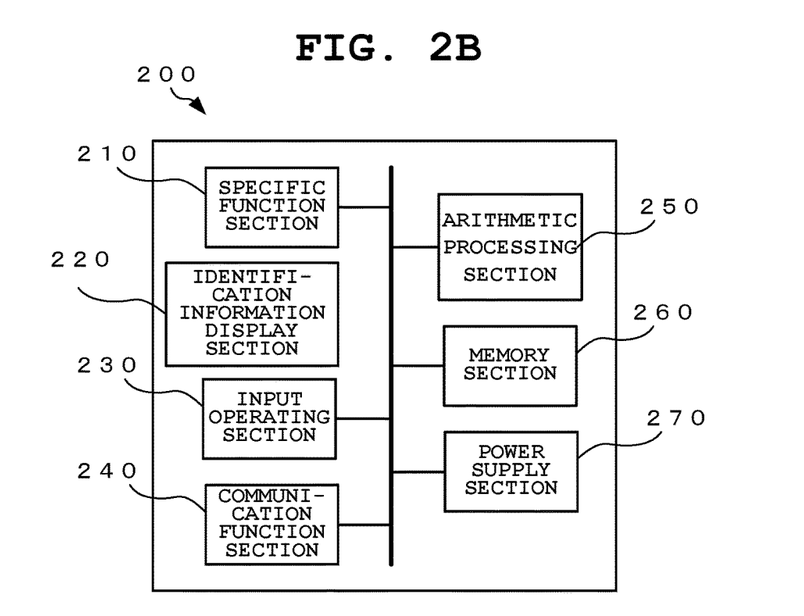

FIG. 2A and FIG. 2B are block diagrams showing examples of the functional structures of a portable device and a target device that are applied in the first embodiment, of which FIG. 2A is a block diagram showing an example of the functional structure of the portable device, and FIG. 2B is a block diagram showing an example of the functional structure of the target device.

The communication system according to the first embodiment of the present invention, for example, includes a portable device (first electronic device) 100 that is used by being carried by a user, such as a smartphone, tablet terminal, or digital camera, as depicted in FIG. 1A and FIG. 1B, and one or a plurality of target devices (second electronic devices) 200 having a wireless communication function of a specific communication standard so that they can be individually connected to the portable device 100, as depicted in FIG. 1C to FIG. 1E.

Here, the target device 200 may be a stationary electronic device such as a personal computer, a printer, or a wireless LAN router that serves as an access point in a network such as a wireless LAN, or may be a portable electronic device such as a smartphone, a tablet terminal, a digital camera, or a smartwatch.

Note that, in order to simplify descriptions, the present embodiment is described based on an assumption that the target device 200 is a stationary electronic device such as a printer or a wireless LAN router, or that the target device 200 has been placed on a desk or the like in a stationary state or substantially in a stationary state if it is a portable electronic device.

(Portable Device)

The portable device 100 has an outer appearance such as that depicted in FIG. 1A and FIG. 1B, in which a housing 102 is provided with a camera lens 112 for image capturing in an imaging section 110 described later, and a display panel 122 including a touch panel (selection means) 132.

For example, in a portable device 100 such as a smartphone or tablet terminal, the display panel 122 including the touch panel 132 is provided on one surface side (front side in the drawing) of the housing 102 in a slate shape, and the camera lens 112 for image capturing is provided on the other surface side (rear side in the drawing) thereof, as depicted in FIG. 1A.

In a portable device 100 such as a digital camera, the display panel 122 including the touch panel 132 is provided on one surface side (rear side in the drawing) of the housing 102 in a box shape, and the camera lens 112 for image capturing is provided on the other surface side (front side in the drawing) thereof, as depicted in FIG. 1B.

The portable device 100 has a functional structure mainly including the imaging section 110, a display section 120, an input operating section 130, a communication function section 140, an arithmetic processing section (control section) 150, a memory section 160, and a power supply section 170, as depicted in FIG. 2A.

The imaging section 110, which has an image sensor such as a CCD (Charge Coupled Device) or CMOS (Complementary Metal-oxide Semiconductor), captures a subject including the target device 200 through the camera lens 112 for image capturing provided on the other surface side of the housing 102, and acquires image data of a captured image showing the subject (hereinafter referred to as a subject image).

The subject image of image data acquired by the imaging section 110 is displayed in real time on the display panel 122 of the display section 120 described later. Also, by a user input operation, image data acquired at arbitrary timing is stored in a data storage memory 162 of the memory section 160.

The display section 120 has a display panel 122 of, for example, a liquid crystal type, organic EL type, or the like, and displays the subject image of image data acquired by imaging section 110, an image or video stored in the memory section 160, an image or video acquired from an external device or a server on a network via the communication function section 140 described later, and the like. In particular, in the present embodiment, the display section 120 displays a combination image which includes the subject image of image data acquired by the image capturing of a subject including the target device 200 and later-described device information of each target device 200 that is superimposed on the subject image.

The display section 120 further displays an operation image and a menu image for setting various operation statuses in the portable device 100.

The input operating section 130 has the touch panel (selection means) 132 provided on the visual field side of the display panel 122, operation switches (such as a push button, slide button, and touch sensor) provided on the front surface, side surface, or the like of the housing 102, and the like. By the user performing an input operation on an operation image, a menu image, or an operation switch displayed on the display panel 122, various operation statuses in the portable device 100 are controlled.

The communication function section 140 has a communication interface function conforming to one or a plurality of short-distance wireless communication standards such as wireless LAN, Bluetooth (registered trademark), and the like. Based on the communication standards set for each one or a plurality of target devices 200, the communication function section 140 connects the portable device 100 to the target device(s) 200 for the transmission and reception of information and data.

Here, short-distance wireless communication between the portable device 100 and the target device 200 may be performed by the transmission and reception of information and data by the devices directly connected to each other, such as Bluetooth (registered trademark) communication, or may be performed by the transmission and reception of information and data by the devices indirectly connected to each other via a specific network, such as wireless LAN communication.

The arithmetic processing section 150 is an arithmetic processing device such as a CPU (Central Processing Unit) or MPU (Micro Processor Unit). By executing a predetermined control program stored in a program memory 164 of the memory section 160, the arithmetic processing section 150 controls operation in each section, such as an imaging operation by the imaging section 110, a display operation by the display section 120, and a transmitting and receiving operation by the communication function section 140.

Also, by executing a predetermined application program stored in the program memory 164, the arithmetic processing section 150 analyzes image data of a subject image acquired by image capturing by the imaging section 110 and, based on the analysis and the like of an identification image included in the subject image and displayed on an identification image presentation section 220 provided on the outer surface of the housing of the target device 200, performs an operation of acquiring the device information of the relevant target device 200 including its communication standard.

Then, the arithmetic processing section 150 performs an operation of causing the combination image which include the image of the target device 200 and simple information based on the acquired device information of the target device 200 that is superimposed on the image of the target device 200 to be displayed on the display panel 122.

Also, for a target device 200 specified (or selected) by the user via the input operating section 130, the arithmetic processing section 150 controls the communication function section 140 such that information and data are transmitted and received by a communication standard based on the above-described acquired device information.

Note that processing for identifying the target device 200 by the arithmetic processing section 150 will be explained later in detail in descriptions of a control method.

Also, the control program to be executed by the arithmetic processing section 150 may be incorporated in advance in the arithmetic processing section 150.

Here, the device information of the target device 200 is technical information required for establishing a wireless connection. The technical information, for example, includes the type of a wireless communication standard, an SSID (Service Set Identifier) that is an identification name of an access point in wireless LAN communication, a BD address that is a device address in Bluetooth communication, a device name, and the like.

The device information herein includes at least the type of the wireless communication standard of the target device 200, and may further include information regarding the availability of wireless communication of the target device 200.

The memory section 160 mainly includes the data storage memory (hereinafter referred to as a "data memory") 162, the program storage memory (hereinafter referred to as a "program memory") 164, and a work data storage memory (hereinafter referred to as a "work memory") 166.

The data memory 162 stores, in a predetermined storage area, various data acquired by the user, various data prepared in advance, and the like such as image data and text data acquired by the imaging section 110.

The program memory 164 stores a control program for achieving a predetermined function in each section, such as an imaging operation by the imaging section 110, a display operation by the display section 120, and a transmitting and receiving operation by the communication function section 140.

In addition, the program memory 164 stores an application program (device information analysis program) for achieving a function for analyzing the identification image of a target device 200 included in a subject image of image data acquired by the imaging section 110 and causing the combination image which includes the image of the target device 200 and an image corresponding to the device information of the target device 200 that is superimposed on the image of the target device 200 to be displayed on the display panel 122, and a function of connecting the portable device 100 to a target device 200 selected by the user by a communication standard based on the above-described device information.

The work memory 166 temporarily stores various data to be used when the above-described control program or application program is executed, and various data generated thereby.

Note that the data memory 162 may be partially or entirely formed as a removable storage medium such as a memory card, and may be structured to be detachable from the portable device 100.

The power supply section 170 supplies power for driving each section of the portable device 100. As the power supply section 170, for example, a primary battery such as a commercially-available battery or a secondary battery such as a lithium ion battery is adopted.

Also, as the power supply section 170, a power supply by energy harvest technology or the like may be adopted singly or in combination, in addition to the primary battery and the secondary battery.

(Target Device)

Each target device 200 has an outer appearance such as that schematically depicted in FIG. 1C, FIG. 1D, or FIG. 1E, in which the identification image presentation section 220 that provides an identification image of a corresponding target device 200 such that it is viewable is provided on the outer surface of a housing 202.

For example, in the target device 200 depicted in FIG. 1C, the identification image on the identification image presentation section 220 has an identifier 222 formed of an AR marker which is an image pattern applied in AR (Augmented Reality) technology.

In the target device 200 depicted in FIG. 1D, the identification image on the identification image presentation section 220 has an identifier 224 formed of a OR code (registered trademark) which is a matrix-type two-dimensional code applied in automatic recognition technology.

In the target device 200 depicted in FIG. 1E, the identification image on the identification image presentation section 220 has an identifier 226 formed of a barcode which is a stripe-shaped one-dimensional code applied in automatic recognition technology.

The target device 200 has a functional structure mainly including a specific function section 210, the identification image presentation section 220, an input operating section 230, a communication function section 240, an arithmetic processing section 250, a memory section 260, and a power supply section 270, as depicted in FIG. 2B. Here, descriptions of structures equivalent to those of the above-described portable device 100 are simplified.

The specific function section 210 performs a function unique to the target device 200 by following an instruction from the arithmetic processing section 250 described later.

For example, when a printer is the target device 200, the specific function section 210 performs a printing function. When a wireless LAN router is the target device 200, this specific function section 210 and the communication function section 240 described later manage and control the communication status of the electronic device connected to a network, or the like.

The identification image presentation section 220 is provided on a portion of the outer surface of the housing 202 where it is viewable by the user carrying the portable device 100. This identification image presentation section 220 displays device information (such as SSID, BD address, and device name) of the target device 200 by using one of the identifiers 222 to 226 depicted in FIG. 1C to FIG. 1E, such as an AR marker, a QR code (registered trademark), or a barcode, so as to allow visual recognition.

Here, the identification image presentation section 220 may have a structure where one of the identifiers 222 to 226 has been directly printed on the outer surface of the housing 202, or a structure where one of the identifiers 222 to 226 has been incorporated in the pattern of the outer surface of the housing 202.

Alternatively, the identification image presentation section 220 may have a structure where a sticker, seal, tag, or the like having one of the identifiers 222 to 216 printed thereon has been affixed or attached to the outer surface of the housing 202.

Also, the identification image presentation section 220 may have a structure where a plurality of identifiers 222, 224, or 226 have been provided in plural areas on the outer surface of the housing 202 so that the identifiers 222, 224, or 226 can be viewed from any direction when the target device 200 is viewed.

In the above-described structure, the identification image presentation section 220 is provided on the outer surface of the housing 202. However, the present invention is not limited thereto. For example, the identification image presentation section 220 may be provided in an area inside the outer surface of the housing 202 which is exposed to outside and can be captured from the outside, and can be captured from the outside by the imaging section 110 of the portable device 100.

The input operating section 230 has a power supply switch and an operation switch provided on the housing 202. By the user performing an input operation, power ON/OFF of the target device 200, and an operation status in the wireless communication function, a specific function, or the like are controlled.

The communication function section 240 has a communication interface function conforming to a short-distance wireless communication standard such as wireless LAN or Bluetooth (registered trademark), and is connected to the portable device 100 to transmit and receive information and data by a communication standard set in advance.

The arithmetic processing section 250 is an arithmetic processing device such as a CPU or MPU. By executing a control program stored in the memory section 260, the arithmetic processing section 250 controls an operation of performing a function unique to the target device 200 in the specific function section 210 and an operation of transmitting and receiving information and data in the communication function section 240.

The memory section 260 stores various information and data to be transmitted to and received from the portable device 100 via the communication function section 240, various data to be used or generated when a function unique to the target device 200 is performed in the specific function section 210, and the like.

Also, the memory section 260 stores various programs to be executed by the arithmetic processing section 250.

The power supply section 270 supplies power for driving each section of the target device 200.

When the target device 200 is a stationary electronic device such as a printer or wireless LAN router, a commercial alternating-current power supply is adopted as the power supply section 270.

When the target device 200 is a portable electronic device such as a smartphone, tablet terminal, or notebook personal computer, a secondary battery such as a lithium ion battery or a commercial alternating-current power supply is adopted.

(Communication System Control Method)

Next, a control method for a communication system including the above-described portable device and target device is described with reference to the drawings.

Here, a control method when devices are connected to each other by using wireless communication of a specific communication standard (wireless connection control method) is described.

Figure 3:
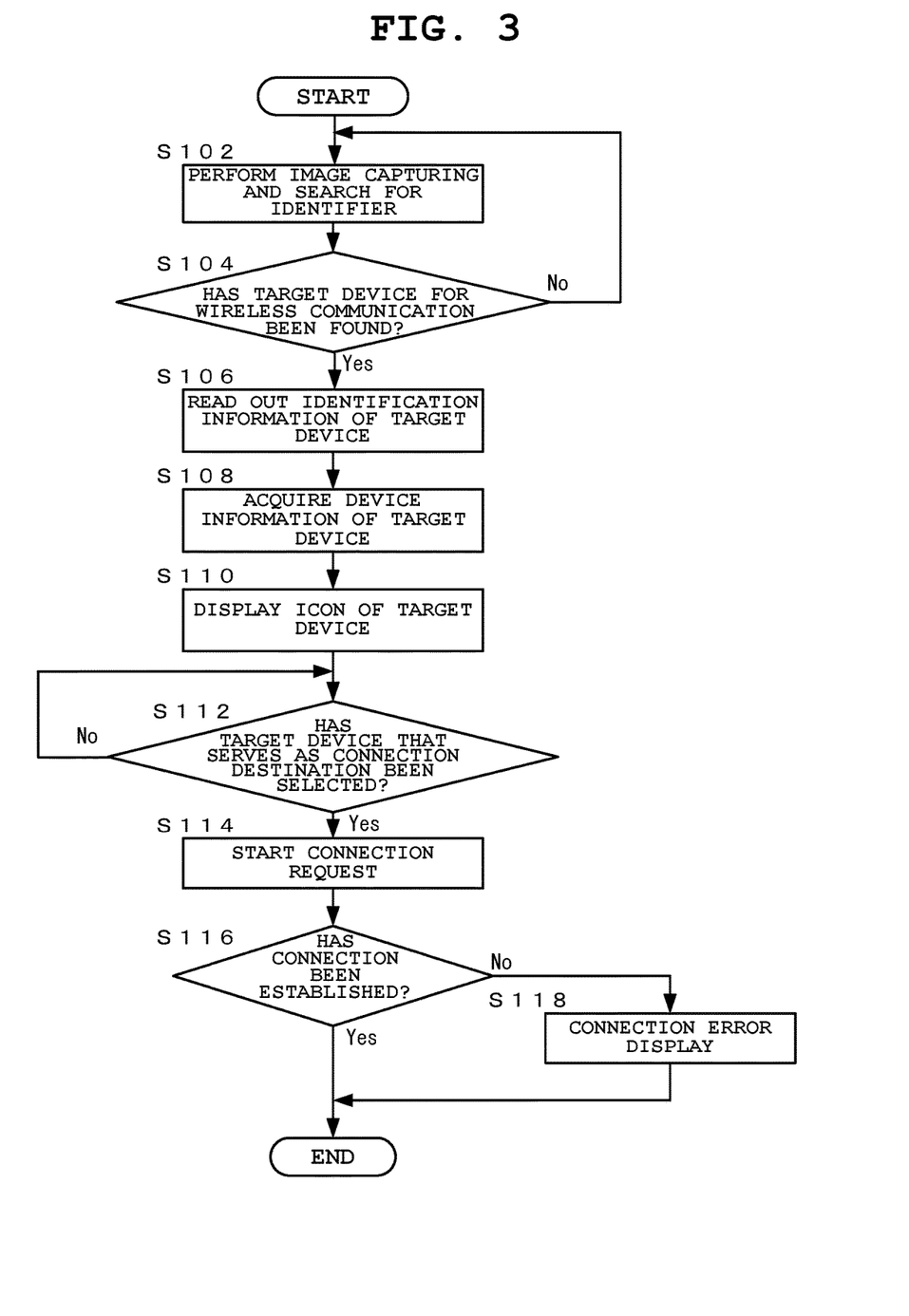
FIG. 3 is a flowchart of an example of a control method for the communication system according to the first embodiment.

FIG. 3 is a flowchart of an example of the control method for the communication system according to the present embodiment.

Figure 4A:
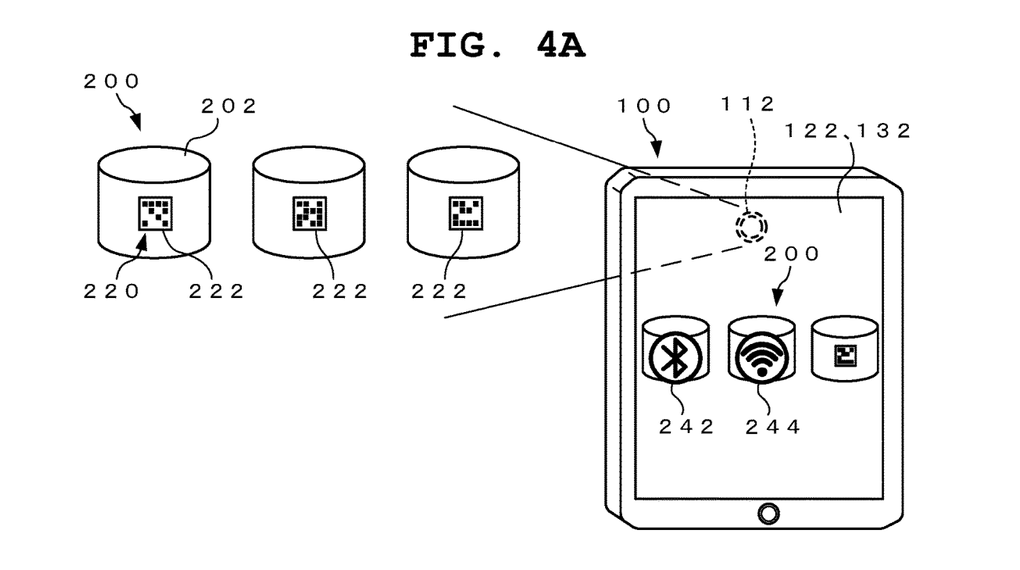
FIG. 4A and FIG. 4B are schematic diagrams showing an example of a wireless connection operation in the communication system according to the first embodiment.
Figure 4B:
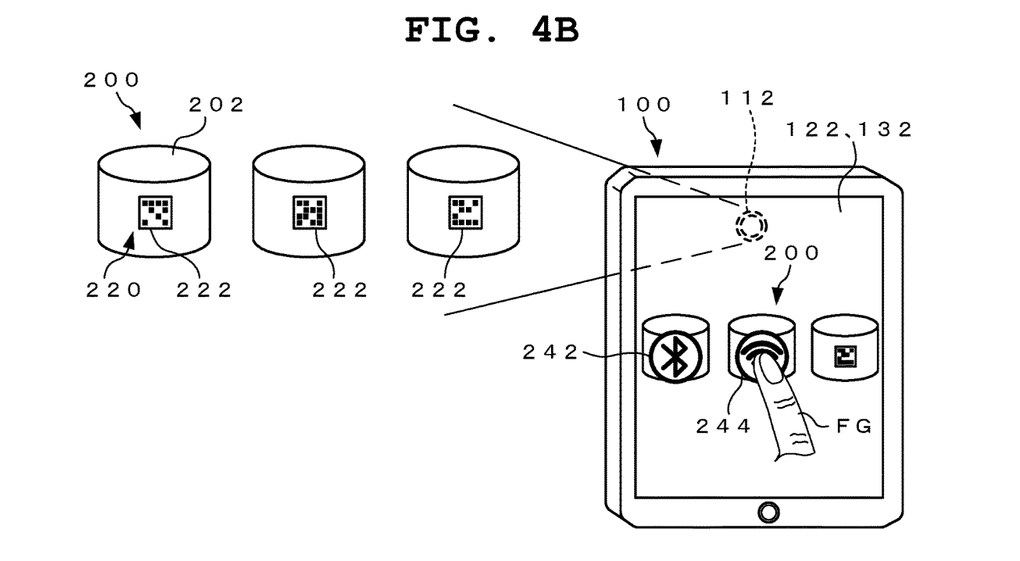

FIG. 4A and FIG. 4B are schematic diagrams showing an example of a wireless connection operation in the communication system according to the present embodiment, of which FIG. 4A is a schematic diagram showing a display example of target devices in the wireless connection operation according to the present embodiment, and FIG. 4B is a schematic diagram showing an example of the selection of a target device in the wireless connection operation.

In the communication system according to the present embodiment, by the user operating the input operating section 130 of the user's portable device 100 and executing a predetermined application program by the arithmetic processing section 150, a control operation for establishing a wireless connection between the portable device 100 and a target device 200 (wireless connection control operation) is started, as depicted in the flowchart of FIG. 3.

In the wireless connection control operation, for example, the user first orients the camera lens 112 of the portable device 100 toward a subject nearby so as to perform image capturing by the imaging section 110, as depicted in FIG. 4A.

Then, the arithmetic processing section 150 searches the captured subject image for an identifier 222, 224, or 226 on the identification image presentation section 220 provided on the outer surface of the housing 202 of a target device 200 (Step S102).

Here, on the display panel 122 of the portable device 100, an image of the nearby subject captured by the imaging section 110, which may include a target device(s) 200 for wireless communication, is displayed as the subject image.

Next, the arithmetic processing section 150 judges whether any target device 200 for wireless communication has been found in the subject image captured by the imaging section 110 (Step S104).

Specifically, by performing image recognition processing on the image data acquired by the imaging section 110, the arithmetic processing section 150 judges whether an image of an identifier 222, 224, or 226 provided on a target device 200 is present in the subject image.

Here, normally, at the time of image capturing by the imaging section 110, it is not known as to whether this identifier 222, 224, or 226 is formed of an AR marker, QR code (registered trademark), barcode, or any other format. Therefore, in the judgment as to whether an image of an identifier 222, 224, or 226 is present, plural types of image recognition processing are applied and performed, such as image recognition processing applied in AR maker reading technology and image recognition processing applied in QR code (registered trademark) and barcode reading technologies.

Next, when judged that no image of an identifier 222, 224, or 226 provided on a target device 200 is present in the subject image and no target device 200 for wireless communication has been found (No at Step S104) the arithmetic processing section 150 returns to Step S102 to repeatedly perform (continue) the identifier searching operation.

Conversely, when judged that an image(s) showing an identifier(s) 222, 224, or 226 provided on a target device(s) 200 is present in the subject image and a target device(s) 200 for wireless communication has been found (Yes at Step S104), the arithmetic processing section 150 reads out, for each target device 200, device information (such as a SSID, BD address, and device name) of the target device 200 indicated by the identifier 222, 224, or 226 (Step S106).

For example, in the reading of the device information indicated by the identifier 222, 224, or 226, if the identifier 222 formed of an AR maker has been used for the identification image presentation section 220, and an image representing the identifier 222 formed of an AR marker has been detected in the subject image as depicted in FIG. 4A, image recognition processing applied in AR marker reading technology is performed on the identifier 222 in the subject image.

If the identifier 222 or 226 formed of QR code (registered trademark) or barcode depicted in FIG. 1D or FIG. 1E has been used for the identification image presentation section 220, and an image representing the identifier 224 or 226 formed of QR code (registered trademark) or barcode has been detected in the subject image, image recognition processing applied in QR code (registered trademark) or barcode reading technology is performed on the identifier 224 or 226 in the subject image.

Next, the arithmetic processing section 150 analyzes the read identification image of the target device 200, and thereby acquires the type of its wireless communication standard as device information (Step S108).

Then, the arithmetic processing section 150 causes predetermined simplified information (image information) 242 and 244 based on the acquired device information to be displayed and superimposed on the image of each target device 200 in the subject image displayed on the display panel 122, as depicted in FIG. 4A (Step S110).

The simplified information 242 and 244 varies according to the type of the wireless communication standard. These pieces of information are set as images, each of which allows the user to easily identify the type of the wireless communication standard. As these images, for example, icon images generally used for Bluetooth communication, wireless LAN communication, and the like are used.

Here, in the device information acquiring processing (Step S108), a configuration may be adopted in which the arithmetic processing section 150 further acquires, as device information, wireless communication availability information indicating whether wireless communication with that target device 200 is available (for example, the target device 200 is ON in an activated state and connection thereto by wireless communication is available) or unavailable (for example, the target device 200 is OFF in a non-activated state and connection thereto by wireless communication is unavailable).

This acquisition of wireless communication availability information is performed by the portable device 100 searching the target device 200 to detect whether the target device 200 can make communication by the wireless communication standard of the target device 200.

In this configuration, in the processing of displaying and superimposing the simplified information 242 and 244 based on the device information (Step S110), the arithmetic processing section 150 causes the simplified information 242 and 244 to be displayed and superimposed on the image of each target device 200 in the subject image on the display panel 122 with the simplified information 242 and 244 including the wireless communication availability information of the target device 200.

For example, in FIG. 4A, the simplified information 242 displayed and superposed on the left target device 200 on the display panel 122 indicates that this target device 200 is an electronic device that is connected to the portable device 100 via Bluetooth communication and therefore wireless communication is available (that is, connection by wireless communication is available).

Also, in FIG. 4A, the simplified information 244 displayed and superposed on the center target device 200 on the display panel 122 indicates that this target device 200 is an electronic device that is connected to the portable device 100 via wireless LAN communication and therefore wireless communication is available (that is, connection by wireless communication is available).

On the other hand, in FIG. 4A, the target device 200 displayed on the right on the display panel 122 does not show simplified information, which indicates that this target device 200 is an electronic device that is wirelessly connected to the portable device 100 but wireless communication is unavailable (that is, connection by wireless communication is unavailable).

That is, in the present embodiment, not all pieces of information included in device information of a target device 200 but only information required for establishing a wireless connection, such as the type of a wireless communication standard and wireless communication availability, is displayed by using the above-described simplified information 242 and 244 such as icon images in a form easily and intuitively understandable by the user.

In the example of FIG. 4A, general icon images for indicating Bluetooth communication and wireless LAN communication have been applied as the simplified information (image information) 242 and 244 based on the device information of each target device 200. However, the present invention is not limited thereto. As the simplified information 242 and 244, for example, images of known figures or mark, images of simple words or terms, or the like that can be easily and intuitively understood by the user may be applied.

Also, in the example of FIG. 4A, simplified information is not displayed for the target device 200 with which wireless communication is unavailable. However, the present invention is not limited thereto. For example, a configuration may be adopted in which, when wireless communication with a target device 200 has been set to be unavailable, simplified information such as an icon image indicating the type of the wireless communication standard such as Bluetooth communication or wireless LAN communication is displayed and superimposed on an image of the target device 200 with density lower than those of simplified information 242 and 244 displayed when wireless communication is available or with color different from those of the simplified information 242 and 244 displayed when wireless communication is available.

Then, the arithmetic processing section 150 judges whether any target device 200 displayed on the display panel 122 has been selected by the user (Step S112).

Specifically, first, the user visually recognizes the image displayed on the display panel 122. Then, when a target device 200 that serves as a connection destination in wireless communication is present in the subject image and simplified information 242 or 244 is being displayed and superimposed on the image of the target device 200 so as to indicate a wireless communication available state (a state in which connection by wireless communication is available), the user taps a portion of the touch panel 132 where the target device 200 is being displayed with a finger FG or the like, as depicted in FIG. 4B.

As a result, the target device 200 is selected as a connection destination.

When no target device 200 has been selected as a connection destination by the user (No at Step S112), the arithmetic processing section 150 waits until a target device 200 is selected.

On the other hand, when a target device 200 that serves as a connection destination has been selected by the user (Yes at Step S112), the arithmetic processing section 150 starts an operation of controlling the communication function section 140 based on the read device information of the target device 200 to request the target device 200 to establish a wireless connection (Step S114).

Then, based on the presence or absence of a response to the connection request from the target device 200 serving as a connection destination and the contents of the response, the arithmetic processing section 150 judges whether a wireless connection with the target device 200 has been successfully established (Step S116).

When judged that a wireless connection with the target device 200 has been successfully established (Yes at Step S116), the arithmetic processing section 150 ends the series of wireless connection control operations and transmits and receives various information and data to and from the target device 200 via the communication function section 140.

On the other hand, when the establishment of a wireless connection with the target device 200 fails (No at Step S116), the arithmetic processing section 150 causes information indicating the failure (connection error) in the establishment of a wireless connection to be displayed on the display panel 122 (Step S118), and thereby notifies the user of that state. Then, arithmetic processing section 150 ends the series of wireless connection control operations.

Here, as the information indicating the failure in the establishment of a wireless connection, for example, a simple message such as "connection error" may be displayed. Alternatively, when the cause of the failure in the establishment of a wireless connection can be identified, detailed information indicating the cause of the failure in the establishment of a wireless connection may be displayed, such as "the target device is not ON" or "the distance to the target device exceeds a connectable distance".

In the flowchart of FIG. 3, for convenience of description, the series of control operations ends after the processing for the judgment of the establishment of a wireless connection at Steps S116 and S118. However, the arithmetic processing section 150 may return to Step S102 described above to repeatedly perform the series of wireless connection control operations. As a result, even if the establishment of a wireless connection has failed, the user can be prompted to make another try so as to successfully establish a wireless connection with the target device 200.

Although omitted in the flowchart of FIG. 3, the arithmetic processing section 150 constantly or regularly monitors for an input operation for interrupting or ending the control operation and a change in the operation status while performing the series of control operations, and forcibly ends the control operations when an input operation or a status change is detected.

Specifically, when an operation of turning the power supply switch OFF by the user, a decrease in the battery remaining amount of the power supply section 170, anomaly in a function or application being executed, and the like are detected, the arithmetic processing section 150 forcibly interrupts and ends the series of control operations.

Next, operations and effects of the communication system according to the present embodiment are described by providing a comparative example.

Figure 5:
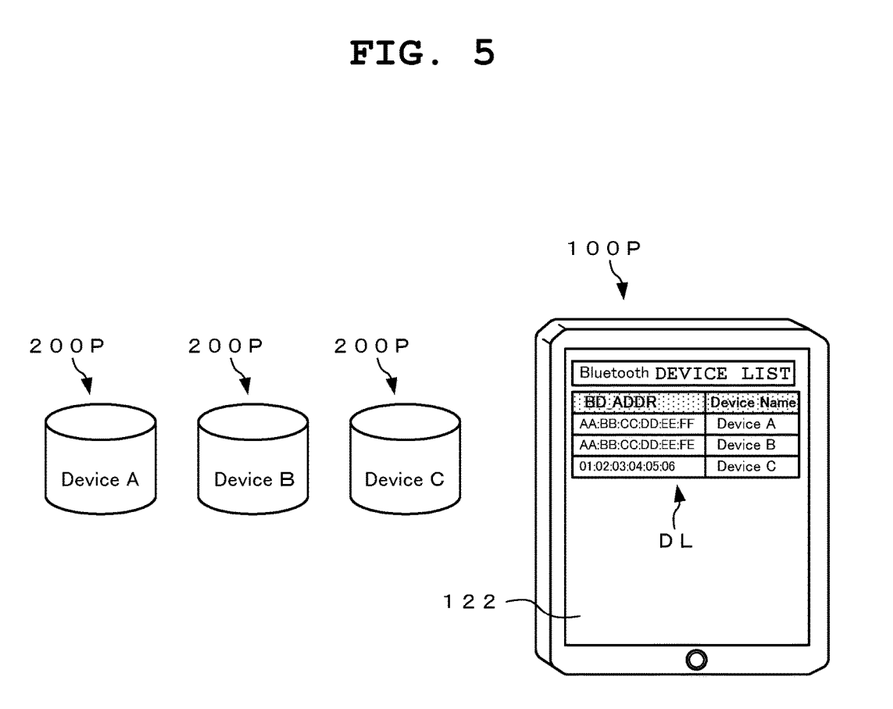
FIG. 5 is a schematic diagram showing a comparative example with respect to the wireless connection operation in the communication system.

FIG. 5 is a schematic diagram showing a comparative example with respect to the wireless connection operation in the communication system.

Figure 6:
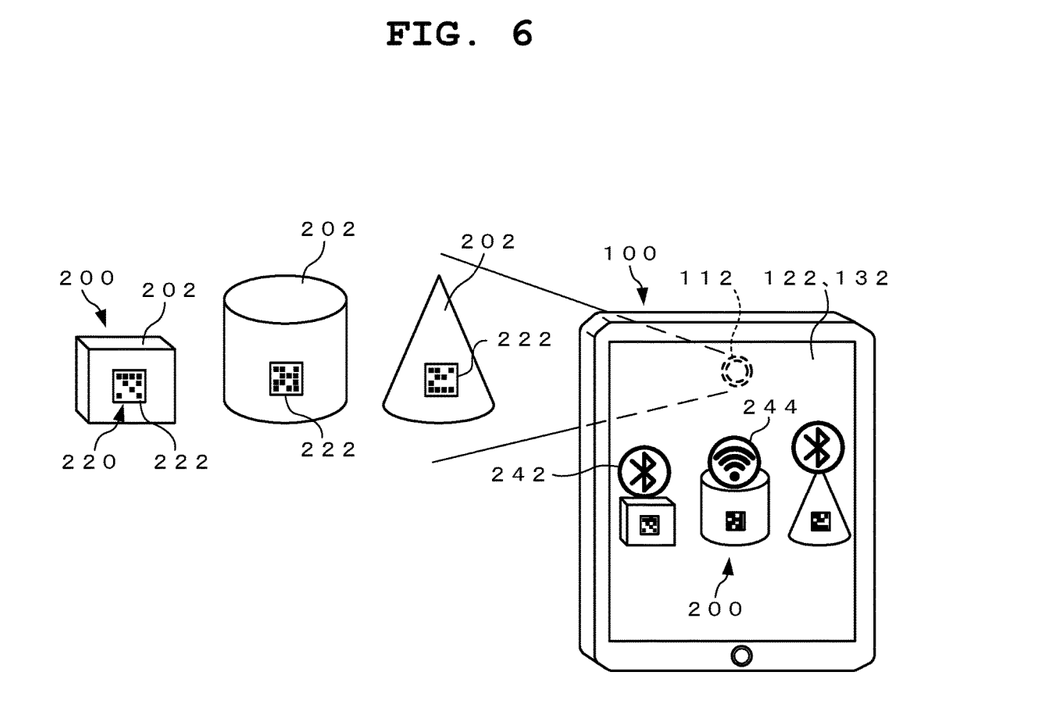
FIG. 6 is a schematic diagram showing another example of the wireless connection operation in the communication system according to the first embodiment.

FIG. 6 is a schematic diagram showing another example of the wireless connection operation in the communication system according to the present embodiment.

Note that sections equivalent to those of the above-described embodiment are provided with the same reference numerals and descriptions thereof are simplified.

As described in "BACKGROUND OF THE INVENTION", as a general method for determining an electronic device that serves as a target device when information and data are transmitted and received between electronic devices by using wireless communication, a method is generally adopted in which information regarding the product name, type number, address, identification information (ID), and the like of each electronic device 200P serving as a connection candidate is displayed on the display panel 122 of an electronic device 100P in a list form as a device list DL, as depicted in the comparative example of FIG. 5.

However, this device list DL is merely a list where technical information is displayed. Therefore, if the user does not have technical knowledge regarding wireless communication, it is difficult to intuitively recognize an electronic device serving as a connection candidate. Moreover, when plural pieces of similar device information are displayed in the device list DL, an electronic device 200P to be a connection target cannot be judged correctly, and an erroneous selection may be made, which leads to connection to an unintended electronic device 200P or makes connection disabled.

By contrast, in the present embodiment, the identifier 222 of the identification image presentation section 220 provided on the housing 202 of each target device 200 is read out by the imaging section 110 of the portable device 100 when the user selects a target device 200 that serves as a connection destination for wireless connection, and the device information of each target device 200 is analyzed.

Then, on the images of the target devices 200 imaged by the imaging section 110 of the portable device 100 and displayed on the display section 120, simplified information 242 and 246 such as icon images are displayed and superimposed, as information regarding the wireless communication standard type and wireless communication availability of each target device 200.

Accordingly, the user is not required to have detailed knowledge about technical device information such as the type of the wireless communication standard for the portable device 100 and the target device 200 that serves as a connection destination, the availability of wireless communication, and the like. By visually recognizing the simplified information 242 and 246 displayed and superimposed on the images of the target devices 200 in an imaging range, the user can intuitively and correctly recognize and select the target device 200 that serves as a connection destination.

As a result of this configuration, it is possible to prevent the occurrence of problems in transmitting and receiving information and data between electronic devices using short-distance wireless communication, such as an erroneous selection which leads to connection to an electronic device unintended by the user or makes connection disabled, and wireless connection between desired electronic devices can be easily and reliably performed.

In the present embodiment, the simplified information 242 and 244 based on the device information of the target device 200 are displayed and superimposed on the images of the respective target devices 200 on the display section 120, as depicted in FIG. 4A and FIG. 4B. However, the present invention is not limited thereto.

That is, any configuration may be adopted in the present invention as long as the images of the respective target devices 200 on the display section 120 and the simplified information 242 and 244 based on the device information of the respective target devices 200 are displayed in association and combination with each other.

Therefore, for example, a configuration such as that depicted in FIG. 6 may be adopted in which, in a subject image displayed on the display panel 122, the simplified information 242 and 244 is displayed with it being shifted from images of target devices 200 or is displayed near the images.

In this configuration, it is possible to visually recognize the entire outer shape of a target device 200 that serves as a connection destination. Therefore, the user can more intuitively and correctly recognize and select the target device based on not only the simplified information 242 and 244 but also the outer shape. As a result, wireless connection between desired electronic devices can be easily and reliably performed.

Second Embodiment

Next, a second embodiment of the communication system according to the present invention is described with reference to the drawings.

Figure 7A:
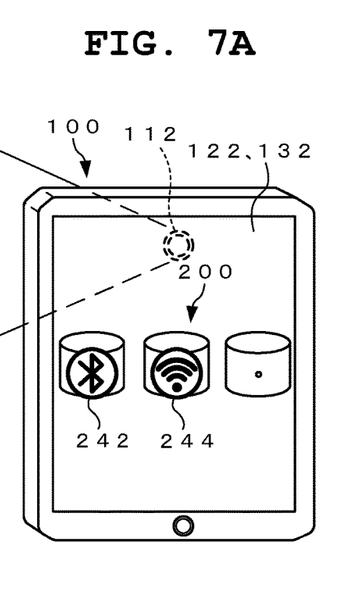
FIG. 7A and FIG. 7B are schematic structural diagrams showing a second embodiment of the communication system according to the present invention.
Figure 7B:
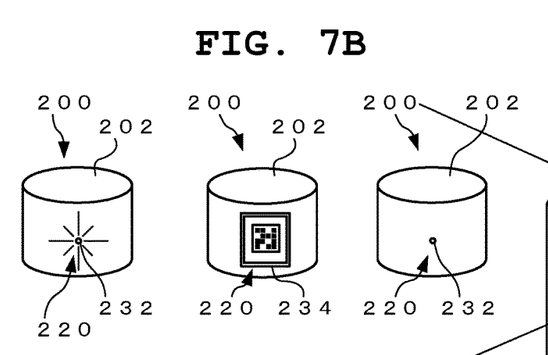

FIG. 7A and FIG. 7B are schematic structural diagrams of the second embodiment of the communication system according to the present invention.

Figure 8:
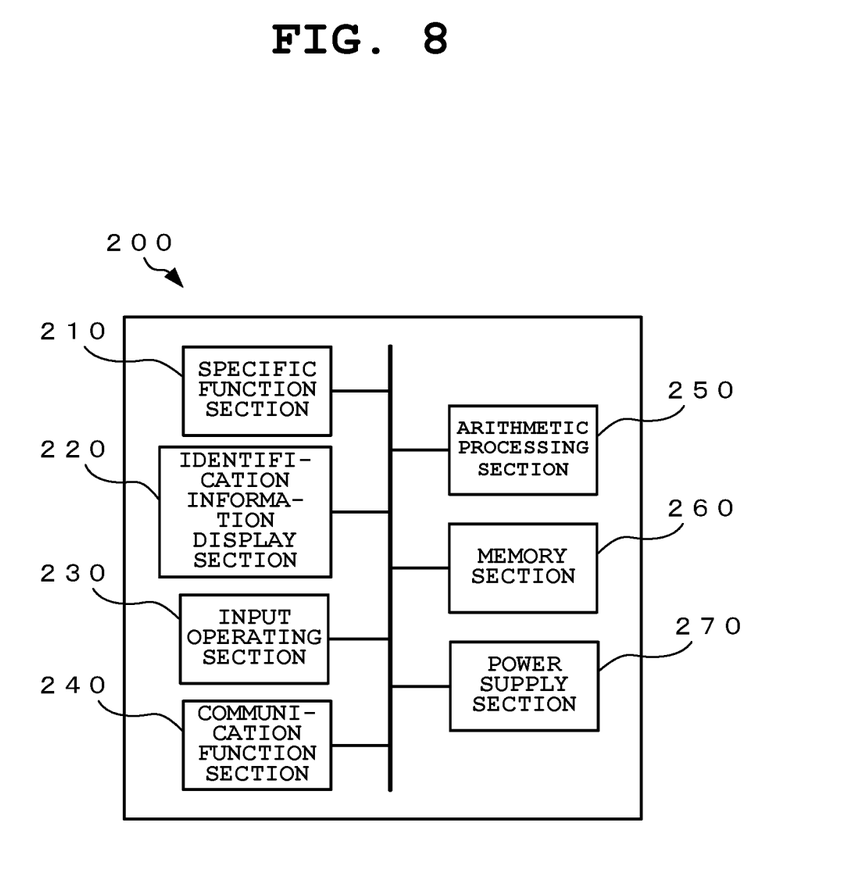
FIG. 8 is a block diagram showing an example of the functional structure of a target device that is applied in the second embodiment.

FIG. 8 is a block diagram showing an example of the functional structure of a target device applied in the present embodiment.

Note that sections equivalent to those of the above-described first embodiment are provided with the same reference numerals and descriptions thereof are simplified.

In the above-described first embodiment, the structure has been described in which the identification image presentation section 220 having the identifier 222, 224, or 226 formed of an AR marker, QR code (registered trade mark), or the like is provided on the outer surface of the housing of each target device.

A feature of the second embodiment is that the identification image presentation section 220 has a light-emitting element and/or a display section, and its light emission pattern and/or displayed image pattern is functioned as an identifier having device information.

As with the above-described first embodiment, the communication system according to the second embodiment includes the portable device 100 that is used by being carried by a user and one or plurality of target devices 200 having a wireless communication function so that they can be individually connected to the portable device 100, as depicted in FIG. 7A and FIG. 7B.

Here, the portable device 100 has an outer appearance and functional structure equivalent to those of the first embodiment.

The target device 200, for example, has an outer appearance such as that depicted on the left and right in FIG. 7B, in which a light-emitting element 232 such as an LED (light-emitting diode) capable of visible light communication is provided on the outer surface of the housing 202 as the identification image presentation section 220. Alternatively, the target device 200 has an outer appearance such as that depicted on the center in FIG. 7B, in which a display panel 234 of a liquid crystal type, organic EL type, electronic paper type, or the like is provided on the outer surface of the housing 202 as the identification image presentation section 220.

Each target device 200 has a configuration where the identification image presentation section 220 is controlled by the arithmetic processing section 250 as depicted in FIG. 8, as compared with the functional configuration described in the first embodiment.

Specifically, in the case where the identification image presentation section 220 has the light-emitting element 232, technology of visible light communication is applied, and the light-emitting element 232 performs a lighting operation with a predetermined light emission pattern indicating the device information of the target device 200 at predetermined intervals or constantly while the target device 200 is being driven (ON state), by following an instruction from the arithmetic processing section 250.

Also, in the case where the identification image presentation section 220 has the display panel 234, image recognition technology or automatic recognition technology similar to those of AR markers, QR code (registered trademark), or the like described in the first embodiment is applied, and the display panel 234 performs an operation of displaying a predetermined image pattern indicating the device information of the target device 200 at predetermined intervals or constantly while the target device 200 is being driven (ON state), by following an instruction from the arithmetic processing section 250.

That is, the light emission pattern of the light-emitting element 232 or the image pattern displayed on the display panel 234 in the identification image presentation section 220 has a function equivalent to those of the identifiers described in the first embodiment.

When performed based on the flowchart described in the first embodiment (refer to FIG. 3), a control method for the communication system including the above-described target device is performed as follows.

That is, when the target devices 200 are in activated (ON) states, the light-emitting element 232 of the identification image presentation section 220 performs a light-emitting operation with a predetermined light emission pattern, as depicted on the left in FIG. 7B.

Alternatively, a predetermined image pattern is displayed on the display panel 234, as depicted on the center in FIG. 7B.

The portable device 100 which is being carried by the user searches for and captures the light emission pattern and/or the image pattern as an identifier(s), and reads out an identification image of each target device 200 (corresponding to Steps S102 to S106).

Then, by analyzing the read identification image of each target device 200, the arithmetic processing section 150 acquires device information (Step S108), and causes the simplified information 242 and 244 such as icon images based on the acquired device information to be displayed and superimposed on images of the target devices 200 in a subject image displayed on the display panel 122 (Step S110), as depicted on the left and center in FIG. 7A.

On the other hand, when the target devices 200 are in non-activated (OFF) states, the light-emitting element 232 of the identification image presentation section 220 does not perform a light-emitting operation, or no image pattern is displayed on the display panel 234, as depicted on the right in FIG. 7B.

Accordingly, no identification image is read out by the portable device 100. In the subject image displayed on the display panel 122, only the images of the target devices 200 are displayed, and the simplified information 242 and 244 such as icon images based on the device information is not displayed, as depicted on the right in FIG. 7A.

Then, the user visually recognizes the images of the target devices 200 displayed on the display panel 122 and the presence or absence of the display of the simplified information 242 and 244, and selects a target device 200 that serves as a connection destination, whereby a wireless connection is established, and the transmission and reception of information and data to and from the target device 200 is performed, as with the above-described first embodiment (Steps S112 to S118).

As described above, in the present embodiment, only the light-emitting element 232 or the display panel 234 on the identification image presentation section 220 of a target device 200 in an activated (ON) state performs a light-emitting operation and a display operation.

Therefore, based on the light-emitting operation or the display operation of the identification image presentation section 220 of each target device 200, information regarding the type of a wireless communication standard and wireless communication availability is displayed and superimposed on only an image of a target device 200 in an activated state in a subject image displayed on the display section 120, by using the simplified information 242 and 246 such as icon images.

As a result of this configuration, the user is not required to be particularly aware of the activated state of a target device 200 that serves as a connection destination, technical device information regarding the type of a wireless communication standard for communication with the target device 200, and the availability of wireless communication. By visually recognizing a subject image displayed on the display panel, the user can intuitively and correctly recognize and select a target device 200 capable of wireless connection, whereby wireless connection between desired devices can be quickly and reliably performed.

In the present embodiment, the light emission pattern of the light-emitting element 232 provided on the identification image presentation section 220 and the image pattern displayed on the display panel 234 can be arbitrarily changed by following an instruction from the arithmetic processing section 250. As a result of this configuration, for example, even when device information is changed, this change can be easily and quickly addressed.

Also, in a case where a display panel of an electronic paper type or the like is adopted as the identification image presentation section 220, power consumption regarding the display of an image pattern that functions as an identifier can be significantly reduced.

In the present embodiment, the identification image presentation section 220 provided with the light-emitting element 232 or the display panel 234 has been described. However, the present invention is not limited thereto.

That is, any configuration can be adopted in the present invention as long as the identification image of a target device 200 is reported or transmitted to the portable device 100 by following an instruction from the arithmetic processing section 250.

While the present invention has been described with reference to the preferred embodiments, it is intended that the invention be not limited by any of the details of the description therein but includes all the embodiments which fall within the scope of the appended claims.

What is claimed is:

1. A communication system comprising:
   a first electronic device, and
   at least one second electronic device,
   wherein the second electronic device includes (i) a first communication function section having a function for communication with the first electronic device and (ii) an identification image presentation section which provides, at a position that can be captured from outside, an identification image having device information including a type of a communication standard for the communication to be performed by the first communication function section,
   wherein the first electronic device includes a control section and a display section, and
   wherein the control section (i) acquires the device information from a captured image of the identification image, and (ii) when the second electronic device is in a state where communication can be made, causes a combination image obtained by combining an image of the second electronic device and image information corresponding to the device information to be displayed on the display section, and, when the second electronic device is in a state where communication cannot be made, causes the image of the second electronic device to be displayed on the display section but causes the image information not to be displayed on the display section.

2. The communication system according to claim 1, wherein the control section (i) acquires communication availability information as to whether the first communication function section of the second electronic device is connectable to the first electronic device via the communication, and (ii) controls display of the combination image based on the communication availability information.

3. The communication system according to claim 1,
   wherein the control section acquires the device information of the second electronic device from the identification image in a subject image captured so as to include the identification image, and causes the combination image to be displayed on the display section, and
   wherein the identification image presentation section in the second electronic device has an identifier having an image pattern indicating the device information, a display panel which displays an image pattern indicating the device information, or a light-emitting element which emits light in a light emission pattern indicating the device information.

4. The communication system according to claim 1, wherein the control section (i) acquires, from a plurality of identification images of a plurality of second electronic devices in a subject image acquired by imaging the plurality of second electronic devices so as to include the plurality of identification images of the plurality of second electronic devices, plural pieces of device information indicating types of communication standards of the plurality of second electronic devices, and (ii) sets the combination image to plural images that combine images of the plurality of second electronic devices in the subject image and plural pieces of image information correspond to the plural pieces of device information with each other.

5. The communication system according to claim 4,
   wherein the first electronic device includes a second communication function section having a function for performing communication with one of the plurality of second electronic devices and a selecting section which selects one of the images of the plurality of second electronic devices displayed on the display section, and
   wherein the control section, when an image of a specific second electronic device is selected by the selecting section from among the images of the plurality of second electronic devices displayed on the display section, controls the second communication function section such that communication is performed between the first electronic device and the specific second electronic device by a specific communication standard for communication to be performed by the first communication function section included in the specific second electronic device.

6. The communication system according to claim 1, wherein the image information is an icon image or figure indicating the type of the communication standard.

7. An electronic device comprising:
   a control section, and
   a display section,
   wherein the control section (i) acquires device information from a captured image of an identification image which is provided on a position that can be captured from outside of at least one other electronic device having a function for communication, wherein the identification image has the device information including a type of a communication standard for communication to be performed by the other electronic device, and (ii) when the second electronic device is in a state where communication can be made, causes a combination image obtained by combining an image of the other electronic device and image information corresponding to the device information to be displayed on the display section, and, when the second electronic device is in a state where communication cannot be made, causes the image of the second electronic device to be displayed on the display section but causes the image information not to be displayed on the display section.

8. The electronic device according to claim 7, wherein the control section (i) acquires communication availability information as to whether the other electronic device is connectable to the electronic device via the communication, and (ii) controls display of the combination image based on the communication availability information.

9. The electronic device according to claim 7, wherein the control section (i) acquires, from a plurality of identification images of a plurality of other electronic devices in a subject image acquired by imaging the plurality of other electronic devices so as to include the plurality of identification images of the plurality of other electronic devices, plural pieces of device information indicating types of communication standards of the plurality of other electronic devices, and (ii) sets the combination image to plural images that combine images of the plurality of other electronic devices in the subject image and plural pieces of image information correspond to the plural pieces of device information with each other.

10. The electronic device according to claim 9, further comprising:

a selecting section which selects one of the images of the plurality of other electronic devices displayed on the display section, wherein the control section, when an image of a specific electronic device is selected by the selecting section from among the images of the plurality of other electronic devices displayed on the display section, controls the electronic device such that communication is performed by a specific communication standard for communication to be performed by the specific electronic device.

11. A control method for a communication system, the communication system comprising a first electronic device and at least one second electronic device, wherein the second electric device includes a function for communication and an identification image presentation section which provides, at a position that can be captured from outside, an identification image having device information including a type of a communication standard for communication to be performed by the second electronic device, the control method comprising:

a step of acquiring, in the first electronic device, the device information from a captured image of the identification image, and a step of, when the second electronic device is in a state where communication can be made, causing a combination image obtained by combining an image of the second electronic device and image information corresponding to the device information to be displayed on a display section of the first electronic device, and, when the second electronic device is in a state where communication cannot be made, causing the image of the second electronic device to be displayed on the display section but causing the image information not to be displayed on the display section.

12. The control method for the communication system according to claim 11, further comprising:

a step of acquiring communication availability information as to whether the second electronic device is connectable to the first electronic device via the communication, wherein the step of displaying on the display section includes a step of controlling display of the combination image based on the communication availability information.

13. The control method for the communication system according to claim 11, wherein the step of acquiring the device information includes a step of acquiring, from a plurality of identification images of a plurality of second electronic devices in a subject image acquired by imaging the plurality of second electronic devices so as to include the plurality of identification images of the plurality of second electronic devices, plural pieces of device information indicating types of communication standards of the plurality of second electronic devices, and wherein the step of displaying on the display section includes a step of setting the combination image to plural images that combine images of the plurality of second electronic devices in the subject image and plural pieces of image information correspond to the plural pieces of device information with each other.

14. The control method for the communication system according to claim 13, further comprising:

a step of selecting one of the images of the plurality of second electronic devices displayed on the display section, and a step of controlling the first electronic device such that, when an image of a specific second electronic device is selected by the selecting step from among the images of the plurality of second electronic devices displayed on the display section, communication is performed between the first electronic device and the specific second electronic device by a specific communication standard for communication to be performed by the specific second electronic device.

15. A non-transitory computer-readable storage medium having stored thereon a control program for a communication system, the communication system comprising a first electronic device and at least one second electronic device, wherein the second electric device includes a function for communication and an identification image presentation section which provides, at a position that can be captured from outside, an identification image having device information including a type of a communication standard for communication to be performed by the second electronic device, the control program being executable by a computer to actualize functions comprising:

processing for acquiring, in the first electronic device, the device information from a captured image of the identification image, and processing for, when the second electronic device is in a state where communication can be made, causing a combination image an image of the second electronic device and image information corresponding to the device information to be displayed on a display section of the first electronic device, and, when the second electronic device is in a state where communication cannot be made, causing the image of the second electronic device to be displayed on the display section but causing the image information not to be displayed on the display section.

16. The non-transitory computer-readable storage medium according to claim 15, further comprising:

processing for acquiring communication availability information as to whether a communication function section of the second electronic device is connectable to the first electronic device via the communication, wherein the processing for displaying on the display section includes processing for controlling display of the combination image based on the communication availability information.

17. The non-transitory computer-readable storage medium according to claim 15, wherein the processing for acquiring the device information includes processing for acquiring, from a plurality of identification images of a plurality of second electronic devices in a subject image acquired by imaging the plurality of second electronic devices so as to include the plurality of identification images of the plurality of second electronic devices, plural pieces of device information indicating types of communication standards of the plurality of second electronic devices, and wherein the processing for displaying on the display section includes processing for setting the combination image to plural images that combine images of the plurality of second electronic devices in the subject image and plural pieces of image information correspond to the plural pieces of device information with each other.

18. The non-transitory computer-readable storage medium according to claim 17, further comprising:
   processing for selecting one of the images of the plurality of second electronic devices displayed on the display section, and
   processing for controlling the first electronic device such that, when an image of a specific second electronic device is selected by the selecting processing from among the images of the plurality of second electronic devices displayed on the display section, communication is performed between the first electronic device and the specific second electronic device by a specific communication standard for communication to be performed by the specific second electronic device.

* * * * *